United States Patent [19]

Spatafora et al.

[11] Patent Number: 5,318,165
[45] Date of Patent: Jun. 7, 1994

[54] METHOD AND DEVICE FOR TRANSFERRING PRODUCTS IN EQUALLY-SPACED MANNER TO A WRAPPING LINE

[75] Inventors: Mario Spatafora; Giulio Strazzari, both of Bologna, Italy

[73] Assignee: Azionaria Costruzioni Macchine Automatiche A.C.M.A. S.p.A., Bologna, Italy

[21] Appl. No.: 978,758

[22] Filed: Nov. 19, 1992

[30] Foreign Application Priority Data

Nov. 19, 1991 [IT] Italy .................. BO91A 000430

[51] Int. Cl.⁵ .............................. B65G 47/26
[52] U.S. Cl. ..................... 198/433; 198/461; 198/471.1; 198/475.1; 198/493; 198/560
[58] Field of Search ............. 198/433, 493, 560, 461, 198/471.1, 475.1; 406/86, 88, 89

[56] References Cited

U.S. PATENT DOCUMENTS

| | | | |
|---|---|---|---|
| 3,557,932 | 1/1971 | Laub, III | 198/433 |
| 3,868,009 | 2/1975 | Billi et al. | 198/461 |
| 4,086,998 | 5/1978 | van der Schoot | 198/358 |
| 4,883,163 | 11/1989 | Gamberini et al. | 198/471.1 X |
| 4,974,716 | 12/1990 | Yuri et al. | 198/471.1 X |

FOREIGN PATENT DOCUMENTS

| | | |
|---|---|---|
| 1420810 | 11/1965 | France . |
| 2332207 | 6/1977 | France . |
| WO91/12993 | 9/1991 | PCT Int'l Appl. . |
| 1011965 | 12/1965 | United Kingdom . |

Primary Examiner—Cheryl L. Gastineau
Attorney, Agent, or Firm—Oblon, Spivak, McClelland, Maier & Neustadt

[57] ABSTRACT

A method and device for transferring products in an equally-spaced manner to a wrapping line, whereby transverse columns of products traveling parallel to their axis on a first conveyor are fed successively in a first direction perpendicular to the axis of the product. Wherein the products, still traveling in the first direction, are compacted and equally spaced, and then fed parallel to themselves along a curved path extending over an arc of 90°, and are loaded on to a second conveyor traveling in a second direction perpendicular to the first direction and extending parallel to the axis of the products.

15 Claims, 3 Drawing Sheets

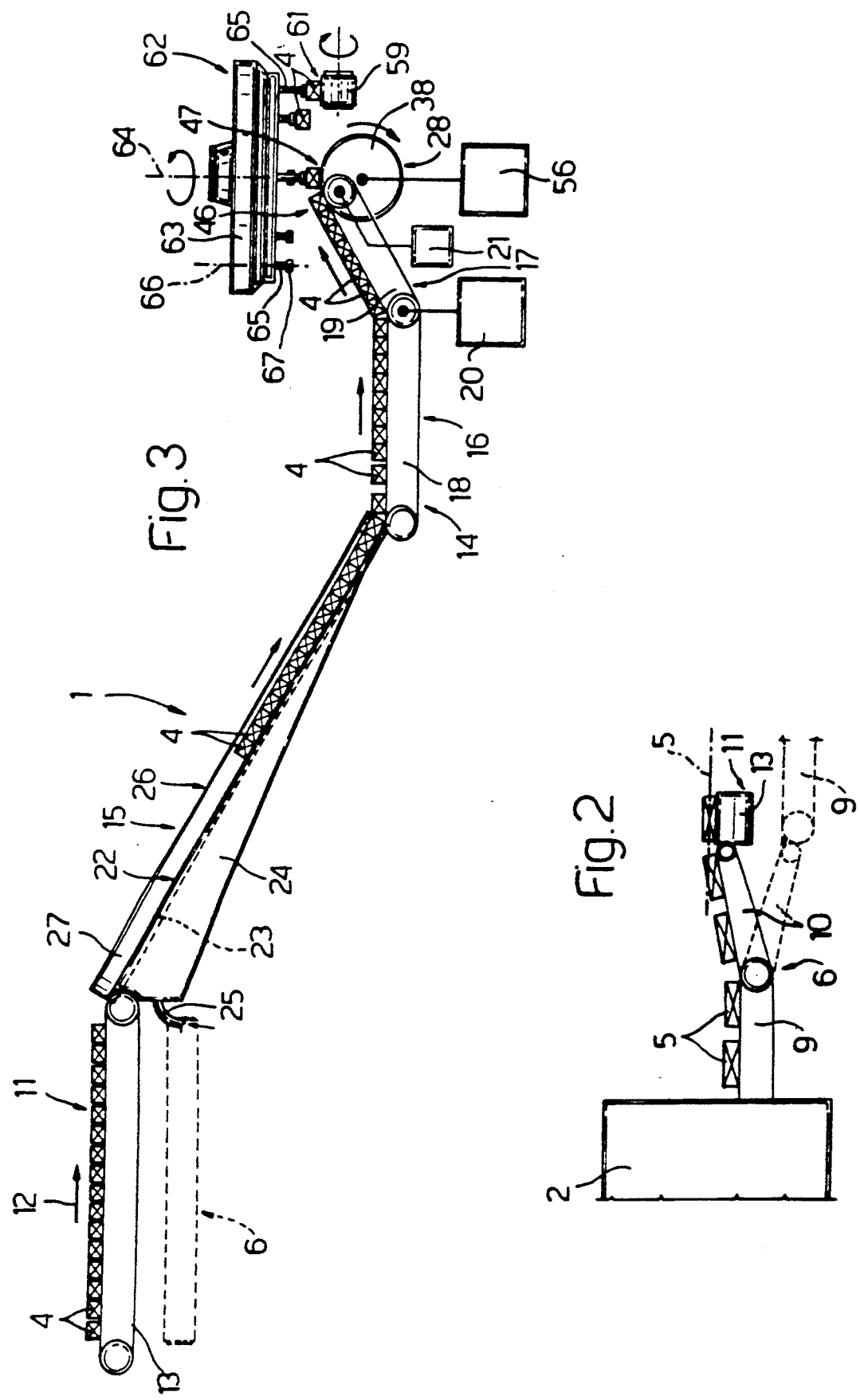

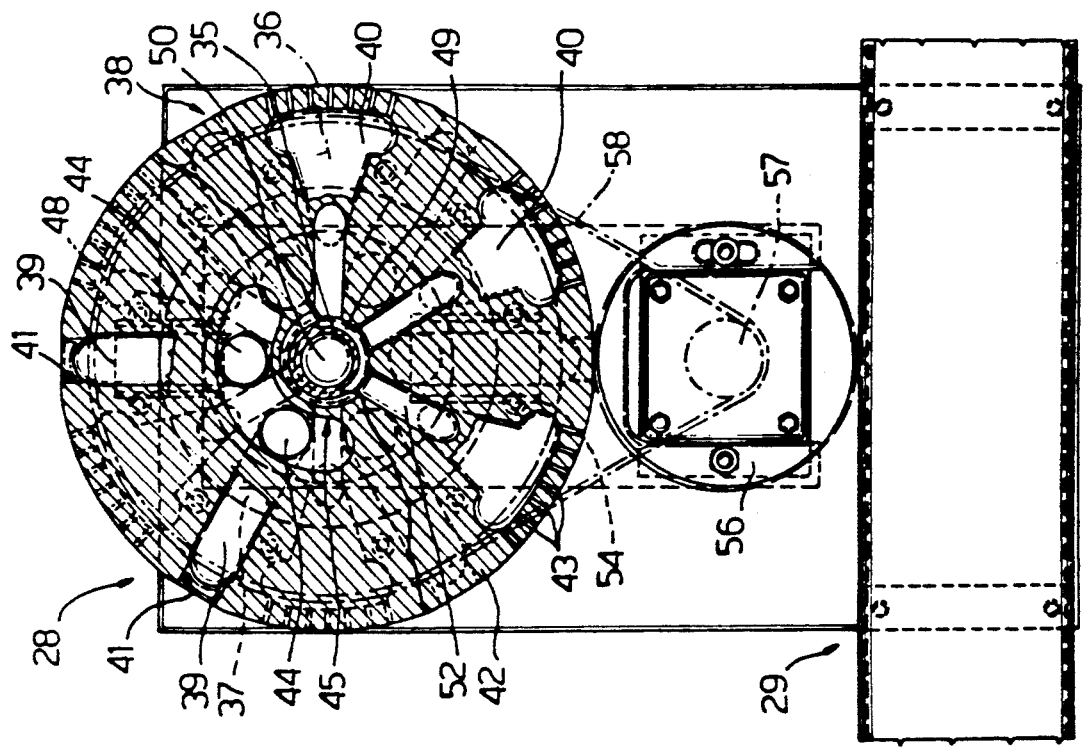
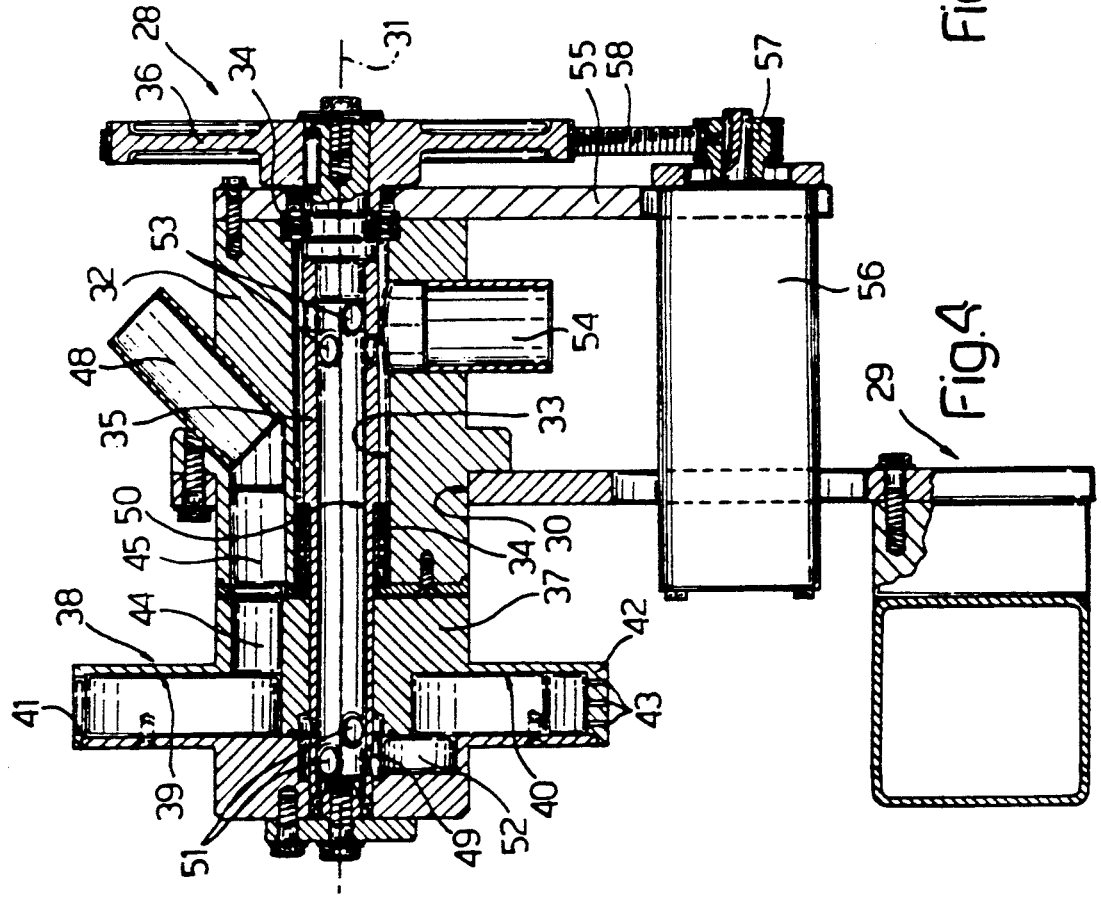
Fig. 5
Fig. 4

020
METHOD AND DEVICE FOR TRANSFERRING PRODUCTS IN EQUALLY-SPACED MANNER TO A WRAPPING LINE

BACKGROUND OF THE INVENTION

1. Field of the Invention

The present invention relates to a method of transferring products in an equally-spaced manner to a wrapping line.

The present invention is especially suitable for use in the food industry, particularly for packing food products, to which the following description refers purely by way of example.

More specifically, the present invention may be used to advantage not only for packing elongated, preferably rectangular parallelepiped food products such as snacks or similar, to which the following description refers specifically, but also, as will be seen, for packing food products of any shape, e.g. round or square.

2. Discussion of the Background

Wrapping lines for snacks or similar normally comprise a packing machine on which the snacks are loaded axially, i.e. longitudinally, and wrapped inside a tubular wrapping.

Wrapping lines of the aforementioned type normally cooperate, via a transfer device, with the output conveyor on the production line, on which conveyor the snacks are normally arranged substantially randomly in columns perpendicular to both a first direction, corresponding to the traveling direction of the output conveyor, and to the longitudinal axis of the snacks themselves, and are picked up successively by the transfer device and fed successively in a second direction substantially perpendicular to the first direction.

On known transfer devices, the snacks, initially traveling, as stated, perpendicular to the longitudinal axis and in more or less random sequence, are brought into contact with one another to form an orderly sequence consisting of a continuous column, and are then accelerated to form an orderly sequence in which they are equally spaced.

At this point, the snacks, still traveling transversely and perpendicular to the longitudinal axis, are fed successively on to a rotating device, normally consisting of a deflecting member, by which they are rotated 90°, so that the longitudinal axis is parallel to the traveling direction, and fed axially on to the wrapping line.

Due to the rotating device possibly affecting the spacing of the snacks, which must be accurately spaced on reaching the input to the wrapping line, the snacks downstream from the rotating device must again be compacted and equally spaced before being fed on to the wrapping line.

Consequently, in addition to subjecting the snacks to considerable stress, mainly due to the rotating device, known transfer devices of the aforementioned type are extremely cumbersome lengthwise, and to no advantage in terms of capacity in the sense that the device could also be employed as a store for compensating for any reduction in the operating speed of the wrapping line. In fact, over most of the length of known transfer devices of the above type, the snacks travel separately and parallel to the longitudinal axis, so that a relatively small number of snacks is sufficient for occupying substantially the entire path defined by the transfer device.

To at least some extent, the same also applies to known devices for transferring round or square products, which, though a 90° rotating device is obviously not required, must nevertheless be repeatedly grouped, equally spaced and aligned, and also travel separately over most of the length of the transfer device, thus resulting in a drastic reduction in the operating capacity of the device.

SUMMARY OF THE INVENTION

It is an object of the present invention to provide a method of transferring products, particularly food products, in an equally-spaced manner to a wrapping line, designed to overcome the aforementioned drawbacks.

According to the present invention, there is provided a method of transferring products in an equally-spaced manner to a wrapping line, the products presenting a first axis of symmetry, and the method being characterized by the fact that it comprises stages consisting in withdrawing a first substantially random sequence of products off first conveyor means and in a first direction perpendicular to said first axis; compacting the products in said first sequence, still traveling in said first direction, so as to bring the products into contact with one another and so form a second orderly sequence; accelerating the products in said second sequence, still traveling in said first direction, so as to form a third orderly sequence in which the products are equally spaced; withdrawing the products in said third sequence one at a time by means of a transfer unit at a loading station; feeding the products, by means of the transfer unit, parallel to themselves and along a curved path extending over an arc of 90° to an unloading station; and feeding the products at the unloading station on to second conveyor means traveling in a second direction perpendicular to the first direction and extending parallel to said first axis.

The present invention also relates to a device for transferring products in an equally-spaced manner to a wrapping line.

According to the present invention, there is provided a device for transferring products in an equally-spaced manner to a wrapping line, the products presenting a first axis of symmetry, and the device being characterized by the fact that it comprises, in combination, first conveyor means for feeding the products parallel to said first axis; pickup means for withdrawing a first substantially random sequence of products of f the first conveyor means, and f ceding the products in a first direction perpendicular to said first axis; compacting means for compacting the products in said first sequence and feeding the products in said first direction and in such a manner as to bring the products into contact with one another and so form a second orderly sequence; accelerating and spacing means for accelerating the products in said second sequence and in said first direction, so as to form a third orderly sequence wherein the products are equally spaced; second conveyor means traveling in a second direction perpendicular to the first direction and extending parallel to said first axis; a loading station on said accelerating means; an unloading station on said second conveyor means; and a transfer unit for withdrawing the products in said third sequence one at a time at said loading station and transferring them successively to said unloading station; said transfer unit being designed to transfer the products parallel to themselves and along a curved path extending over an arc of 90°.

BRIEF DESCRIPTION OF THE DRAWINGS

A non-limiting embodiment of the present invention will be described by way of example with reference to the accompanying drawings, in which:

FIG. 2 shows a schematic side view of a first detail in FIG. 1;

FIG. 3 shows a schematic side view of a second detail in FIG. 1;

FIG. 4 shows a larger-scale axial section of a third detail in FIG. 1; and

FIG. 5 shows a cross section of the FIG. 4 detail.

DESCRIPTION OF THE PREFERRED EMBODIMENT

Figure 1:
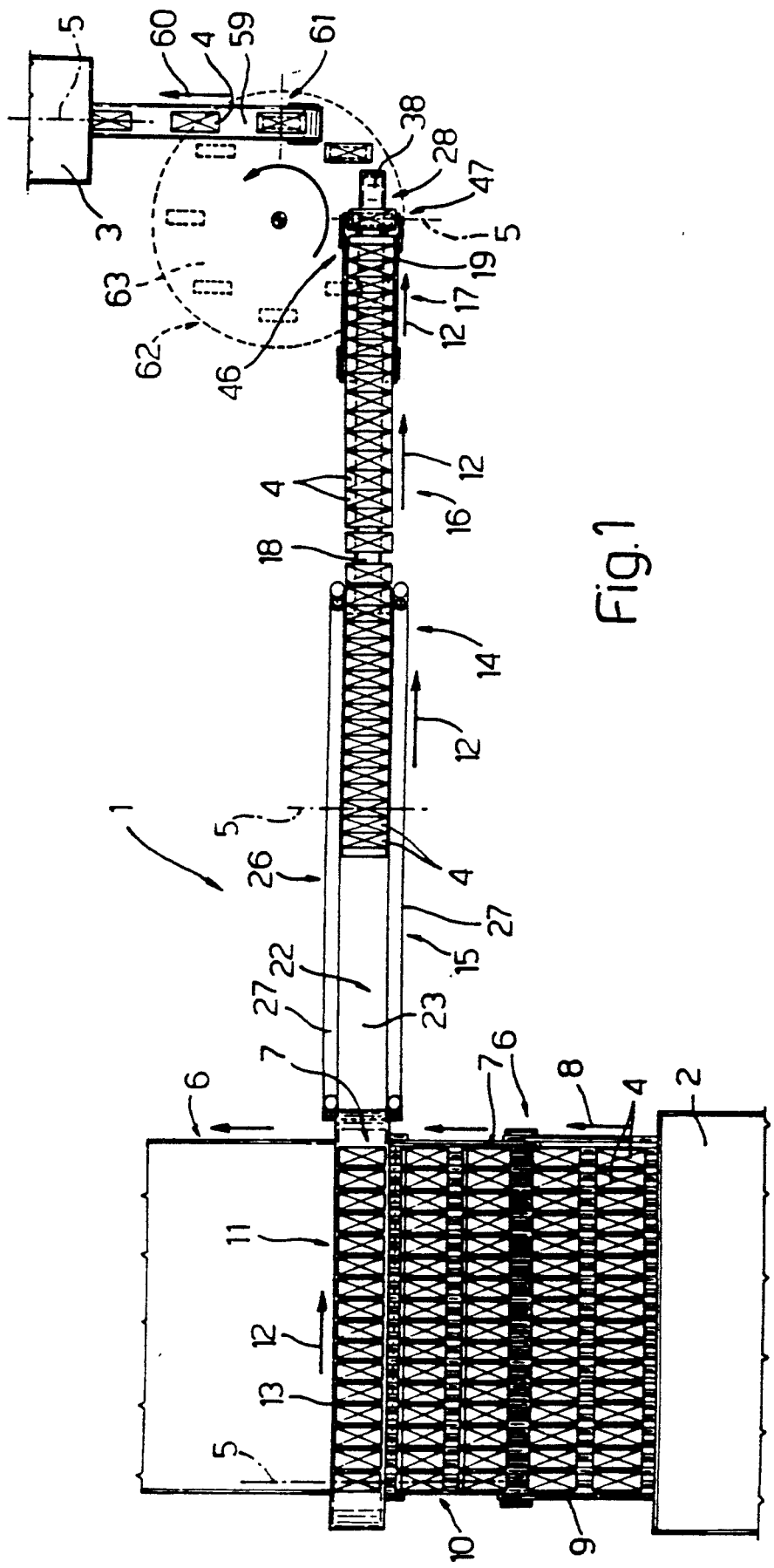
FIG. 1 shows a schematic plan view of a preferred embodiment of the transfer device according to the present invention.

Number 1 in FIG. 1 indicates a device for transferring in an equally-spaced manner, from a production line 2 to a wrapping line 3, products 4 consisting in the example shown of snacks, each substantially in the form of a rectangular parallelepiped with a longitudinal axis of symmetry 5.

Device 1 comprises a conveyor belt 6 connected to the output of production line 2 for feeding products 4 parallel to longitudinal axis 5. In FIG. 1, for the sake of simplicity, the products 4 on first conveyor 6 are shown arranged in neat columns 7 perpendicular to the traveling direction 8 of conveyor 6, whereas, in actual fact, at the output of production line 2, they are normally arranged in a substantially random manner in columns 7, each of which thus normally defines a substantially random sequence of products 4.

As shown in FIG. 2, conveyor 6 consists of a first number of conveyors 9 aligned in direction 8 and connected by a second number of conveyors 10, each having the input end hinged to the output end of a respective conveyor 9, and pivoting about an axis perpendicular to direction 8 between a lowered idle position (shown by the dotted line in FIG. 2) wherein conveyor 10 connects two adjacent conveyors 9, and a raised operating position (shown by the continuous line in FIG. 2) wherein conveyor 10 connects the output end of respective conveyor 9 to a respective pickup device 11 for successively receiving columns 7 and feeding them in direction 12 perpendicular to both direction 8 and axes 5.

As shown more clearly in FIGS. 1 and 3, each pickup device 11 comprises a conveyor belt 13 on to which columns 7 are unloaded successively with respective conveyor 10 in the raised operating position. As they are received off the respective conveyor 10, conveyor 13 provides for removing columns 7 in direction 12, and feeding the random sequence of products 4 in columns 7 to a compacting device 14 by which products 4 are fed in direction 12 in such a manner as to be brought into contact with one another and so form an orderly sequence of products 4.

Again with reference to FIGS. 1 and 3, compacting device 14 defines a path along which products 4 are fed in direction 12, and which comprises an initial downward-sloping portion 15, a substantially flat intermediate portion 16, and an upward-sloping end portion 17. The intermediate and end portions 16 and 17 are defined respectively by an intermediate conveyor 18 and an end conveyor 19 connected in series, and are driven in direction 12 by respective drive motors 20 and 21 in such a manner that the speed of conveyor 18 is at least equal to that of conveyor 19. According to a variation not shown, both conveyors 18 and 19 are driven at the same speed by a single motor.

Initial portion 15, on the other hand, is defined by an air bed 22 comprising a perforated base plate 23 which acts as a cover for a box 24 communicating with a conduit 25 for supplying fluid (in the example shown, compressed air) through the holes (not shown) in plate 23 and so pneumatically supporting products 4 as they travel down portion 15 in direction 12.

To prevent products 4 from being positioned on a slant as they travel down towards conveyor 18, air bed 22 presents a guide device 26 consisting, in the example shown, of two endless belts 27 located on either side of air bed 22 and cooperating with the opposite ends of products 4.

For preventing products 4 from exceeding a given speed along portion 15 and so being damaged at the input of conveyor 18, air bed 22 may be fitted with a known braking device (not shown) by which it is divided into two or more portions, and which comprises one or more looped belts traveling at a controlled speed in the direction 12 and connecting said portions of air bed 22.

Compacting device 14 provides for successively feeding products 4 to an accelerating device 28 for forming a further orderly sequence in which products 4 are equally spaced a given distance apart.

As shown more clearly in FIGS. 4 and 5, accelerating device 28 comprises a vertical frame 29 having a through hole 30 with an axis 31 parallel to axes 5. Frame 29 is fitted integral with a tubular body 32 extending through hole 30 and having an axial conduit 33 in which a tubular shaft 35 is mounted for rotation via the interposition of bearings 34. A first end portion of shaft 35 extends outwards of tubular body 32 and is fitted with a pulley 36; and a second end portion of shaft 35 projects from the opposite end of tubular body 32 to that facing pulley 36, and is fitted with the central hub 37 of a wheel 38.

As shown more clearly in FIG. 3, wheel 38 is positioned vertically and, close to the top, is tangent to the output end of conveyor 19.

With reference to FIGS. 4 and 5, inside wheel 38 there is formed a first succession of radial chambers 39 alternating with a second succession of chambers 40. Each chamber 39 communicates externally via a respective opening 41 formed through the outer shell 42 of wheel 38, while each chamber 40 communicates externally via a number of openings or holes 43 also formed through shell 42.

The inner end of each chamber 39 communicates with a respective conduit 44 formed axially through hub 37 towards tubular body 32 and communicating with a curved chamber 45 formed in tubular body 32, facing wheel 38, and extending over an arc, in the rotational direction of wheel 38, between a pickup station 46 at the point of tangency between conveyor 19 and shell 42, and a loading station 47 at the top of wheel 38. Chamber 45 communicates with a conduit 48 formed through tubular body 32 and communicating with a known suction device (not shown).

Hub 37 presents an inner annular chamber 49 surrounding shaft 35 and communicating, on one side, with an axial conduit 50 inside shaft 35 via a number of radial holes 51 formed through shaft 35, and, on the other side, with a number of radial conduits 52 extending outwards from chamber 49 and each communicating with the inner end of a respective chamber 40. Via a further number of radial holes 53 formed through shaft 35, conduit 50 communicates with a conduit 33 in turn communicating with a known blower (not shown) via a conduit 54 extending radially through tubular body 32 for supplying a pressurized fluid (in the example shown, air) inside conduit 50.

As shown more clearly in FIG. 4, the end of tubular body 32 facing pulley 36 is fitted with a plate 55 supporting a motor 56, the output shaft of which is fitted with a pulley 57 connected to pulley 36 by a drive belt 58 for rotating wheel 38 (clockwise in FIG. 3) about axis 31 at a surface speed greater than the traveling speed of conveyor 19.

As shown more clearly in FIG. 1, transfer device 1 also comprises an output conveyor 59 for feeding products 4 to wrapping line 3 in a direction 60 perpendicular to direction 12.

Products 4 are transferred successively from loading station 47 to unloading station 61 on conveyor 59 by means of a transfer unit 62 comprising a powered carrousel conveyor 63 rotating (counterclockwise in FIG. 1) about an axis 64 perpendicular to both direction 12 and axis 31.

Conveyor 63 is a known carrousel conveyor having a number of vertical output rods 65, each connected to conveyor 63 so as to move axially in relation to the same and to rotate about its axis 66 in the opposite direction to and at the same speed as conveyor 63. Thus, as conveyor 63 is rotated, rods 65 travel, parallel to themselves, along a curved, substantially circular path extending about axis 64 and over both the top of wheel 38 at loading station 47, and conveyor 59 at unloading station 61.

The bottom end of each rod 65 is integrally fitted with a pickup head 67 traveling with respective rod 65 along said curved path, parallel at all times with axes 5, and at a speed substantially equal to the surface speed of wheel 38.

Conveyor 63 and wheel 38 are so timed that, as it travels along said circular path, each pickup head 67 reaches loading station 47 simultaneously with an opening 41.

In actual use, products 4 traveling along conveyor 6 and arranged in random manner in columns 7 are guided upwards by raising conveyor 10 into the operating position, and are fed in successive columns 7 on to conveyor 13 of pickup device 11, on which is formed a random sequence of products 4, which are fed by conveyor 13 to compacting device 14.

On reaching compacting device 14, the groups of products 4 on conveyor 13 slide down, with axes 5 still perpendicular to direction 12, to the bottom end of air bed 22 and the input of conveyor 18 by which they are guided on to a horizontal surface, still traveling in direction 12 perpendicular to axes 5. Though conveyor 18 is driven by motor 20 at a faster speed than that at which products 4 slide down air bed 22, by virtue of the change in direction between air bed 22 and conveyor 18, products 4 are compacted so that they substantially contact one another at the bottom of air bed 22, and are separated slightly on engaging conveyor 18.

As already stated, the speed of conveyor 18 is at least equal to but normally greater than that of conveyor 19, so that products 4 are again compacted as they travel along conveyor 18. The two successive compacting operations to which products 4 are subjected at the bottom of air bed 22 and along conveyor 18 provide for fully stabilizing the orderly sequence formed along conveyors 18 and 19, and for eliminating any "microgaps" remaining between adjacent products 4 at the bottom of air bed 22.

Said orderly sequence is further stabilized by the weight of the column of products 4 formed on upward-sloping conveyor 19 along which the products tend to slide backwards by force of gravity, thus eliminating any gaps remaining between adjacent products 4.

The force of gravity on products 4 entering pickup station 46 cooperates with the detaching thrust exerted on products 4 by the compressed air through holes 43 to prevent the products from being carried forward by friction on wheel 38, and so that suction openings 41 function as seats for transporting products 4 in an equally-spaced manner between pickup station 46 and loading station 47.

The manner in which products 4 are picked up at loading station 47 and fed in equally-spaced manner on to conveyor 59 in direction 60 parallel to axes 5 is self-explanatory.

On device 1 as described above, products 4 are therefore compacted, accelerated and equally spaced substantially only once. Moreover, they are subjected to no impact by which they may possibly be damaged, and only travel separately and parallel to axis 5 along conveyor 59, the rest of the path being covered with the products contacting one another. As such, despite being relatively short, device 1 may accommodate a relatively large number of products 4 and so function, if necessary, as a compensating store.

Obviously, numerous modifications and variations of the present invention are possible in light of the above teachings. It is therefore to be understood that, within the scope of the appended claims, the invention may be practiced otherwise than as specifically described herein.

We claim:

1. A method of transferring products in an equally-spaced number manner to a wrapping line, the products presenting a first axis of symmetry, which comprises:

withdrawing a first substantially random sequence of products off a first conveyor and in a first direction perpendicular to said first axis;

compacting the products in said first sequence, while still traveling in said first direction, so as to bring the products into contact with one another and so form a second orderly sequence;

accelerating the products in said second sequence, while still traveling in said first direction, so as to form a third orderly sequence in which the products are equally spaced;

withdrawing the products in said third sequence one at a time by a transfer unit at a loading station; feeding the products, by the transfer unit, parallel to one another and along a curved path extending over an arc of 90° to an unloading station; and feeding the products at the unloading station on to a second conveyor traveling in a second direction perpendicular to the first direction and extending parallel to said firs axis.

2. A method as claimed in claim 1, accelerating and equally spacing the products by feeding the products in said second sequence on to a third conveyor which is traveling in said first direction and has a succession of equally-spaced seats for conveying the products.

3. A method as claimed in claim 2, wherein said third conveyor means comprises a wheel rotating about a second axis parallel to the first axis, and has a succession of equally-spaced peripheral suction openings alternating with a succession of blowing means, which comprises:

feeding the products in said second sequence on to said wheel in said first direction and along an upward-sloping path portion tangent to the wheel.

4. A method as claimed in claim 3, which comprises:

compacting the products in said first sequence by feeding the products along a path comprising an initially downward-sloping portion, a substantially flat intermediate portion, and an end portion including said upward-sloping portion; said initial portion being defined by an air bed, and said intermediate and end portions being defined respectively by an intermediate conveyor and an end conveyor arranged in series.

5. A method as claimed in claim 4, which comprises:

driving the intermediate conveyor at a speed at least equal to that of the end conveyor and slower than the surface speed of said wheel.

6. A method as claimed in claim 4, which comprises driving the intermediate conveyor at a faster speed than that at which the products travel down said air bed.

7. A method as claimed in claim 1, wherein said products are elongated products, substantially in the form of a rectangular parallelepiped and said first axis is the longer longitudinal axis of the products.

8. A device for transferring products in an equally-spaced manner to a wrapping line, the products presenting a first axis of symmetry, and the device comprising:

a first conveyor for feeding the products parallel to said first axis;

a pickup mechanism for withdrawing a first substantially random sequence of products off the first conveyor, and feeding the products in a first direction perpendicular to said first axis;

a compactor for compacting the products in said first sequence and feeding the products in said first direction and in such a manner as to bring the products into contact with one another and so form a second, orderly sequence;

an accelerating and spacing mechanism for accelerating the products in said second sequence and in said first direction, so as to form a third, orderly sequence wherein the products are equally spaced;

a second conveyor traveling in a second direction perpendicular to the firs direction and extending parallel to said first axis;

a loading station located on said accelerating mechanism;

an unloading station located on said second conveyor means; and a transfer unit for withdrawing the products in said third sequence one at a time at said loading station and transferring the products successively to said unloading station, said transfer unit including a transfer mechanism for transferring the products parallel to themselves and along a curved path extending over an arc of 90°.

9. A device as claimed in claim 8, wherein said accelerating and spacing mechanism comprises a third conveyor traveling in said first direction for accelerating and equally spacing the products in said second sequence; said third conveyor having a succession of equally-spaced seats for conveying the products.

10. A device as claimed in claim 9, wherein said third conveyor comprises a wheel rotating about a second axis parallel to the first axis and having a succession of equally-spaced peripheral suction openings, each respectively defining a seat; said loading station being located at the top of said wheel.

11. A device as claimed in claim 10, which comprises a blower provided between adjacent openings on said wheel.

12. A device as claimed in claim 10, wherein said compactor defines a path along which the products are fed in said first direction and comprises an initially downward-sloping portion, a substantially flat intermediate portion, and an upward-sloping end portion; said intermediate and end portions respectively including an intermediate conveyor and an end conveyor arranged in series; and the end conveyor being tangent to said wheel upstream from said loading station.

13. A device as claimed in claim 12, wherein said initial portion comprises an air bed.

14. A device as claimed in claim 12, which comprises a drive mechanism provided for driving the intermediate conveyor at a speed at least equal to that of the end conveyor and slower than the surface speed of said wheel.

15. A device as claimed in claim 14, wherein said drive mechanism includes a drive member for driving the intermediate conveyor at a speed greater than that at which the products travel down said air bed.

* * * * *